(12) United States Patent
Goel

(10) Patent No.: US 7,508,869 B2
(45) Date of Patent: Mar. 24, 2009

(54) APPARATUS METHOD AND SYSTEM FOR CHARACTERIZING A COMMUNICATION CHANNEL AND INCREASING DATA THROUGHPUT

(75) Inventor: Nagendra Goel, McLean, VA (US)

(73) Assignee: LSI Corporation, Milpitas, CA (US)

( * ) Notice: Subject to any disclaimer, the term of this patent is extended or adjusted under 35 U.S.C. 154(b) by 695 days.

(21) Appl. No.: 10/855,748

(22) Filed: May 27, 2004

(65) Prior Publication Data

US 2005/0265438 A1 Dec. 1, 2005

(51) Int. Cl.
*H04B 17/00* (2006.01)
*H04B 1/10* (2006.01)

(52) U.S. Cl. .......................... 375/227; 455/296

(58) Field of Classification Search ................ 375/227, 375/224, 222, 254, 346; 379/296; 455/296, 455/295
See application file for complete search history.

(56) References Cited

U.S. PATENT DOCUMENTS 5,029,331 A * 7/1991 Heichler et al. ............. 714/790
5,465,412 A * 11/1995 Mueller et al. ............. 455/296
6,516,027 B1 * 2/2003 Kapoor et al. ............. 375/227
2007/0110006 A1 * 5/2007 DiFazio ...................... 370/337

* cited by examiner

*Primary Examiner*—Khai Tran
(74) *Attorney, Agent, or Firm*—Utah Valley Patent Law

(57) ABSTRACT

In contrast to prior are solutions that conduct an averaging operation to estimate metrics related to a communications channel such as a signal-to-noise ratio, the present invention selects a particular value such as a minimum, maximum, or median value from a distribution of values collected over a selected interval. Selecting a particular value from the distribution of values facilitates a more accurate characterization process and increased data throughput. To reduce the processing burden associated with selecting a particular value, the present invention provides a set of cascaded value selection queues that each selects a particular value from the queued values such as a minimum value. The cascaded queues are also successively sub-sampled to reduce the computing resources required to characterize the communications channel. The estimated metrics resulting from the above-described process may be used to adjust the data encoding process and increase data throughput on the communications channel.

21 Claims, 4 Drawing Sheets

APPARATUS METHOD AND SYSTEM FOR CHARACTERIZING A COMMUNICATION CHANNEL AND INCREASING DATA THROUGHPUT

BACKGROUND OF THE INVENTION

1. Field of the Invention

The present invention relates to data communication means and methods. Specifically, the invention relates to apparatus, methods, and systems for characterizing a communications channel to improve data throughput.

2. Description of the Related Art

Communication channels bear information between a sender and receiver and facilitate a wide range of interaction and information transfers such as verbal conversations, text messaging, document transfer, transaction processing, and the like. While most modem communication is conducted digitally, the lowest levels of communication generally involve generating and detecting units of information called symbols using analog means. Often such symbols are communicated via a dispersive and noisy media that degrades the signal as it is propagated. The ability to properly receive a transmitted symbol requires allocating sufficient bandwidth and energy to maintain the integrity of the symbol along the entire propagation path.

FIG. 1 is a block diagram depicting certain aspects of a typical prior art communications system 100. As depicted, the prior art communications system 100 includes an encoder 120 and a decoder 140 equipped with a characterization module 150 such as a signal-to-noise estimator. The encoder 120 receives a data stream 110 which is encoded for transmission over a dispersive and noisy communications channel 130. The encoded data stream is decoded to reconstruct the data stream 110. Due to degradation of the encoded data stream and the resulting communication errors, reconstruction of the data stream 110 may require retransmission of portions of the data stream 110. Such retransmissions are typically expensive and significantly reduce the throughput attained on the communications channel 130.

According to the well known information theorem of Shannon, the maximum data throughput that may be attained on a communications channel 130 is proportional to the bandwidth of the medium and the signal-to-noise ratio (SNR) experienced by the receiver. To optimize data throughput, the communications system 100 may be equipped with a characterization module 150 that characterizes a communication channel's attributes such as bandwidth and signal-to-noise ratio in order to maximize information throughput on the communications channel 130.

In the depicted embodiment, the characterization module 150 monitors the decoding process within the decoder 140, and provides characterization data 160 to the encoder 120 to optimize the encoding process for the communications channel 130. Often such characterization data is initially collected during a training session in which known signals are transmitted across a communications channel. By using the known signal as a reference, and comparing it to what is received, the receiving side characterizes the channel and noise conditions. Once a channel has been characterized, a calculation may be conducted to estimate the number of bits or symbols that can be successfully transmitted from the sender to the receiver. In many systems, channels are periodically or continuously characterized during operation to adjust to changing conditions channel conditions.

Accurate characterization of the communications channel 130, particularly the signal-to-noise ratio of the channel, is essential to maximizing the actual throughput of information. For example, if the actual noise is less than the estimated noise, some of the channel capacity remains unused. On the other hand, if the actual noise is greater than the estimated noise, the communication channel would be incapable of bearing the amount of information that is sent resulting in errors and retransmissions.

In the depicted arrangement, a single transmission channel is depicted. Often, data communication is partitioned into multiple subchannels and assembled at the receiving end. For example, communication between central offices and subscribers is often conducted using multi-tone encoding techniques in which the available spectrum of the channel is divided into frequency sub-bands or tones and each sub-band or tone carries information in parallel with the other sub-bands or tones.

With multi-tone encoding techniques, the ability to characterize each sub-band and adjust to changing channel conditions may significantly increase the throughput attainable on the transmission medium. Unfortunately, many mediums such as subscriber lines connected to central offices may experience impulse noises (typically shorter than 200 microseconds). Such impulse noise may occur frequently enough to cause transmission errors yet infrequently enough that such impulses are averaged out and not accurately captured in the characterization data. The result is substantially reduced performance due to the poor characterization data.

To address the issue of poor characterization data in such systems, a relatively large noise margin may be allocated to each subchannel or tone. Under such a scenario, a transmission error occurs only when the total noise (including the impulse noise) exceeds the noise margin. However, such a strategy is less than optimal in that impulse noise is typically not equal in all sub-bands (i.e. white in spectral content) and the amount of needed noise margin may vary for each sub-band or tone. In other words, those tones that experience greater impulse noise should be allocated a larger noise margin than those tones that experience less impulse noise.

Given the aforementioned issues and challenges related to data communication and the shortcomings of currently available solutions, a need exists for an apparatus, method, and system for characterizing a communications channel and improving data throughput. Beneficially, such an apparatus, method, and system would account for impulse noise in the characterization process and facilitate increased data throughput on a communications channel in an efficient effective manner.

SUMMARY OF THE INVENTION

The present invention has been developed in response to the present state of the art, and in particular, in response to the problems and needs in the art that have not yet been fully solved by currently available data communication means and methods. Accordingly, the present invention has been developed to provide an apparatus, method, and system for improving communications throughput that overcome many or all of the above-discussed shortcomings in the art. The provided apparatus, method, and system may be used to accurately characterize a communications channel and thereby increase information throughput.

In one aspect of the present invention, an apparatus for improving communications throughput includes a measurement module configured to measure a plurality of signal-to-noise values for a communications channel, and a value selection module configured to receive the signal-to-noise values and select a particular value such as a minimum value to provide an estimated signal-to-noise value. The apparatus may also include a channel encoder configured to adjust channel encoding in response to a change in the estimated signal-to-noise value. In contrast to prior art solutions which typically conduct an averaging operation to provide an estimated signal-to-noise ratio, selecting a particular signal-to-noise value such as the minimum value facilitates accurately accounting for impulse noise in the channel characterization process.

In certain embodiments, the value selection module includes a set of value selection queues arranged in a cascaded manner such that each value selection queue buffers multiple values and selects a particular value such as a minimum value for insertion into a subsequent queue. In one embodiment, the measurement module comprises a noise estimator configured to estimate a noise level and a signal estimator configured to estimate a signal level. The measurement module may also include an averaging module configured to conduct an averaging operation on the measured values previous to placement in the value selection queues.

In another aspect of the present invention, a method for improving communications throughput includes measuring a plurality of signal-to-noise values for a communications channel, selecting a particular value of the plurality of signal-to-noise values to provide an estimated signal-to-noise value, and adjusting a channel encoding in response to a change in the selected signal-to-noise value. The particular value selected by the method may be a minimum or maximum value.

In one embodiment, selecting a particular value of the plurality of signal-to-noise values includes queuing a plurality of values, providing a sub-sampled sequence of first selected values from the plurality of values, queuing a plurality of the first selected values, and providing a sub-sampled sequence of second selected values from the sub-sampled sequence of first selected values. Queuing and selecting in a sub-sampled manner reduces the amount of processing involved in selecting a particular value from a long sequence of values such as a minimum, median, or maximum value.

Various elements of the present invention may be combined into a system arranged to carry out the functions or steps presented above. In one embodiment, the system includes a communications channel configured to bear information, a measurement module configured to repetitively measure a signal-to-noise value for the communications channel, a value selection module configured to receive a set of signal-to-noise values and select a particular value to provide an estimated signal-to-noise value, a channel encoder configured to adjust a channel encoding process in response to a change in the estimated signal-to-noise value. In certain embodiments, such as applications where data retransmission is relatively frequent or expensive, the particular value may be a minimum value. In other embodiments, such as applications where data retransmission is relatively infrequent or inexpensive, the particular value may be a maximum value.

In another aspect of the present invention, an apparatus for computing statistical information for a plurality of numerical values includes a first selection queue configured to queue a plurality of values and provide a first selected value from the plurality of values, and a second value selection queue configured to queue a plurality of first selected values and provide a second selected value from the plurality of first selected values. The first and second selected values may be minimum, maximum, or median values.

Similarly, a method for computing statistical information for a plurality of numerical values includes queuing a plurality of values, selecting a first selected value from the plurality of values, queuing a plurality of first selected values, and selecting a second selected value from the plurality of first selected values.

The present invention facilitates characterizing a communications channel and improving throughput using fewer computing resources and may be embodied in hardware or software form or some combination thereof. These and other features and advantages of the present invention will become more fully apparent from the following description and appended claims, or may be learned by the practice of the invention as set forth hereinafter.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
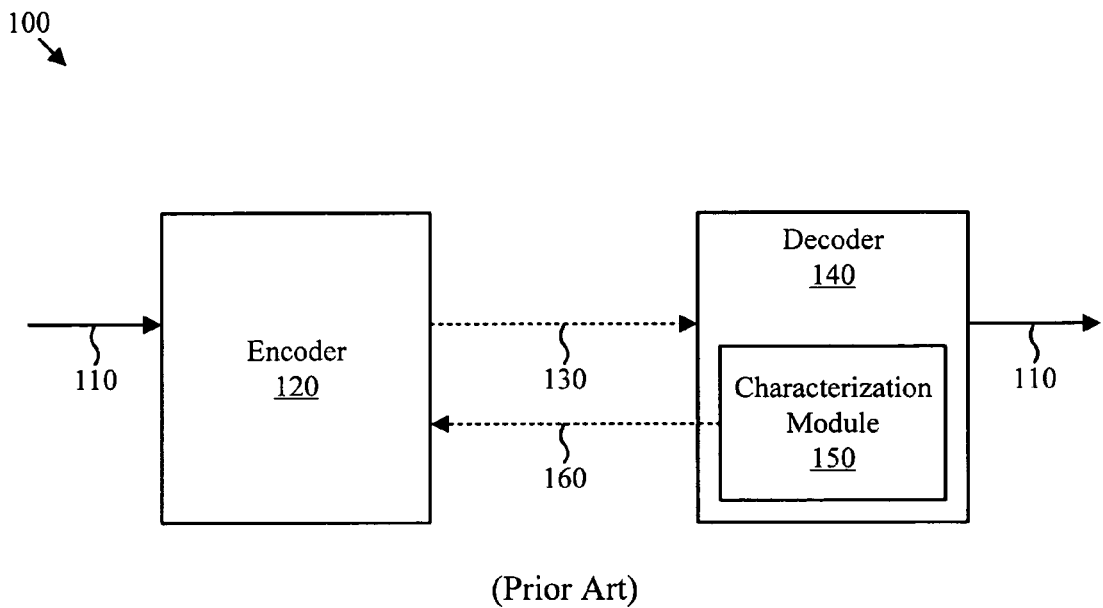
FIG. 1 is a block diagram depicting certain aspects of a typical prior art communications system.

It will be readily understood that the components of the present invention, as generally described and illustrated in the Figures herein, may be arranged and designed in a wide variety of different configurations. Thus, the following more detailed description of the embodiments of the apparatus, method, and system of the present invention, as represented in FIGS. 1 through 5, is not intended to limit the scope of the invention, as claimed, but is merely representative of selected embodiments of the invention.

Many of the functional units described in this specification have been labeled as modules, in order to more particularly emphasize their implementation independence. A module may be implemented via digital or analog circuits and components. For example, a module may be implemented as hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

The features, structures, or characteristics of the invention described throughout this specification may be combined in any suitable manner in one or more embodiments. For example, reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," or similar language throughout this specification do not necessarily all refer to the same embodiment and the described features, structures, or characteristics may be combined in any suitable manner in one or more embodiments.

The present invention sets forth an apparatus, system and method for characterizing a communications channel. In contrast to prior art solutions which typically conduct an averaging operation to provide an estimated signal-to-noise ratio the present invention selects a particular value such as the minimum value in a manner that facilitates accurately accounting for impulse noise and the like. Specifically, the present invention facilitates computing and tracking (over a relatively long interval) various parameters associated with communications channels such as signal-to-noise ratio and efficiently selecting a particular value (from the distribution of values collected over that interval) such as a minimum, maximum, or median value.

Figure 2:
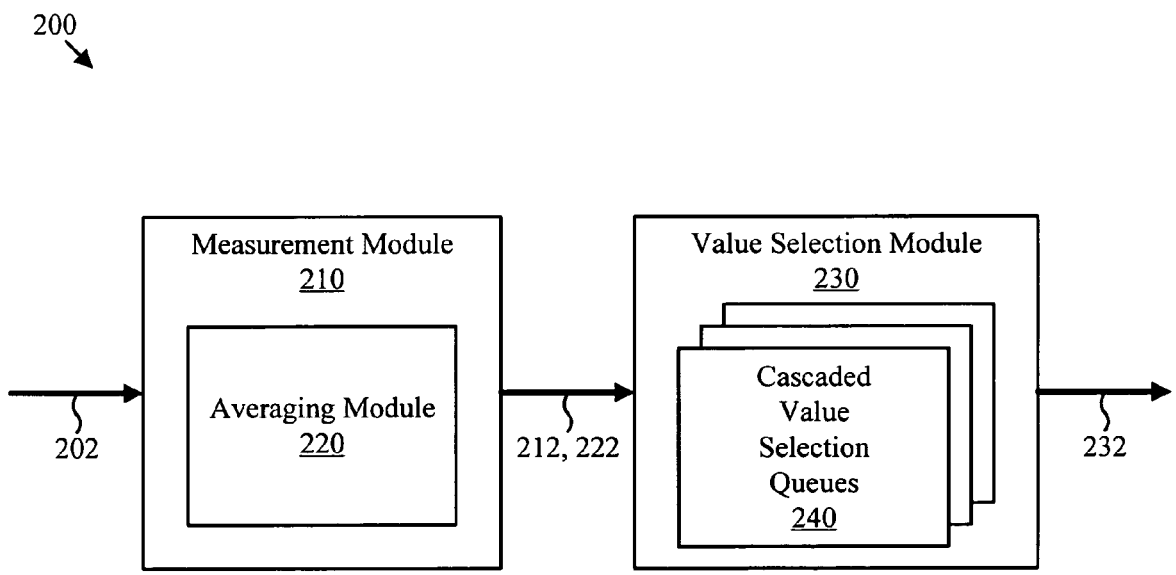
FIG. 2 is a block diagram depicting one embodiment of a channel characterization module of the present invention.

FIG. 2 is a block diagram depicting a channel characterization module of the present invention. As depicted, the channel characterization module 200 includes a measurement module 210, an optional averaging module 220, and a value selection module 230. The channel characterization module 200 extracts one or more parameters 212 associated with a communications channel 202 and provides one or more metrics 232 that characterize the communications channel. In certain embodiment, the channel characterization module 200 may be configured to function as an improved characterization module 150.

The measurement module 210 may provide multiple measurements of a particular parameter 212 associated with the communications channel. The measurement module 210 may conduct operations digitally or via analog means. For example, in one embodiment the measurement module measures a signal error and provides a series of error values associated with estimating a signal. In another embodiment, the measurement module 210 is essentially an A/D converter that samples a signal or parameter associated therewith.

The optional averaging module 220 is preferably configured to conduct an averaging operation on the sequence of parameters 212 provided by the measurement module 210 and to provide an averaged value 222 for the particular parameter 212. In one embodiment, the averaging operation is a root-mean-square (rms) calculation. In other embodiments, the averaging operation is a leaky integrator or a low pass filter. In certain embodiments, the averaging operation may not be needed and the averaging module 220 may be bypassed.

The value selection module 230 is preferably configured to receive a sequence of parameters 212 or averaged values 222 corresponding to an interval of interest and selects a particular value as a representative value or channel metric 232. In one embodiment, the measurement module 210 is configured to provide a series of signal-to-noise values measured from a communications channel, the value selection module 230 is configured to select a minimum value over an interval of interest, and the interval of interest is selected to long enough to provide stable operation while short enough to "forget" old data and facilitate dynamic adjustment to changing channel conditions. In the aforementioned embodiment, the channel characterization module 200 may function as the characterization module 150 depicted in FIG. 1.

In the depicted embodiment, the value selection module 230 includes a set of value selection queues 240 arranged in a cascaded manner. Each value selection queue 230 buffers a number of values and provides a selected value. The selected value provided by the last queue in a cascaded set of queues is provided as the channel metric 232. Selecting and providing selected values via a set of cascaded queues facilitates conducting a statistical operation on the sequence of parameters 212 or averaged values 222 such as determining a minimum, maximum, or median value.

Figure 3:
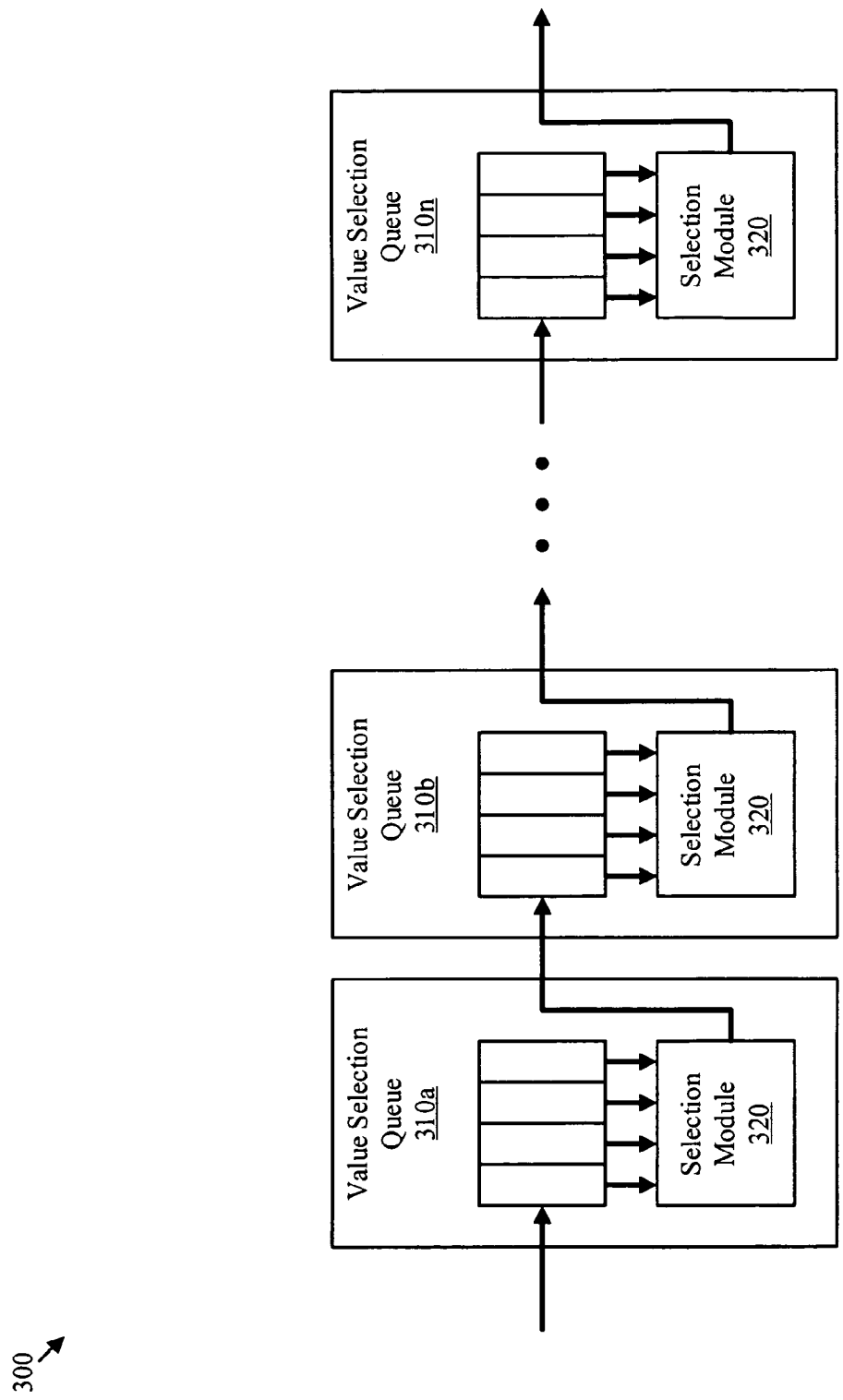
FIG. 3 is a block diagram depicting one embodiment of a value selection module of the present invention.

FIG. 3 is a block diagram depicting one embodiment of the value selection module 300 of the present invention. As depicted, the value selection module 300 includes a number of value selection queues 310 arranged in a cascaded manner. The value selection module 300 is one example of the value selection module 230 depicted in FIG. 2.

Each value selection queue 310 includes a selection module 320 that selects a particular value within the queue for presentation to the next queue. For example, the selection module may select a value meeting particular criteria such as the minimum, maximum, or median value within the queue. In certain embodiments, the selection module may select multiples values for presentation to the next queue. For example, the selection module may select both a minimum and a maximum value.

In the depicted arrangement, the initial queue 310a receives a parameter or averaged parameter from a measurement module 210, an averaging module 220, or the like, and the last queue 310n provides a processed result such as the channel metric 232. The cascaded arrangement of the queues facilitates computing metrics involving a long sequence of values using reduced resources. The length of the queues (each queue may have a different length) and the number of cascaded sections are selected for the needs of the particular application.

In certain embodiments, each queue 310 subsamples the previous queue in order to reduce the number of operations and increase the effective length of the cascaded queues. In the depicted embodiment with queues of length four, queue 310b need only capture the output of queue 310a every fourth value. In such subsampled embodiments, the effective length of the cascaded queues approaches the product of the length of the individual queues. For example, the task of finding the minimum value of a sequence of 256 values may be accomplished with two queues of length 16 or four queues of length 4 instead of one queue of length 256.

Figure 4:
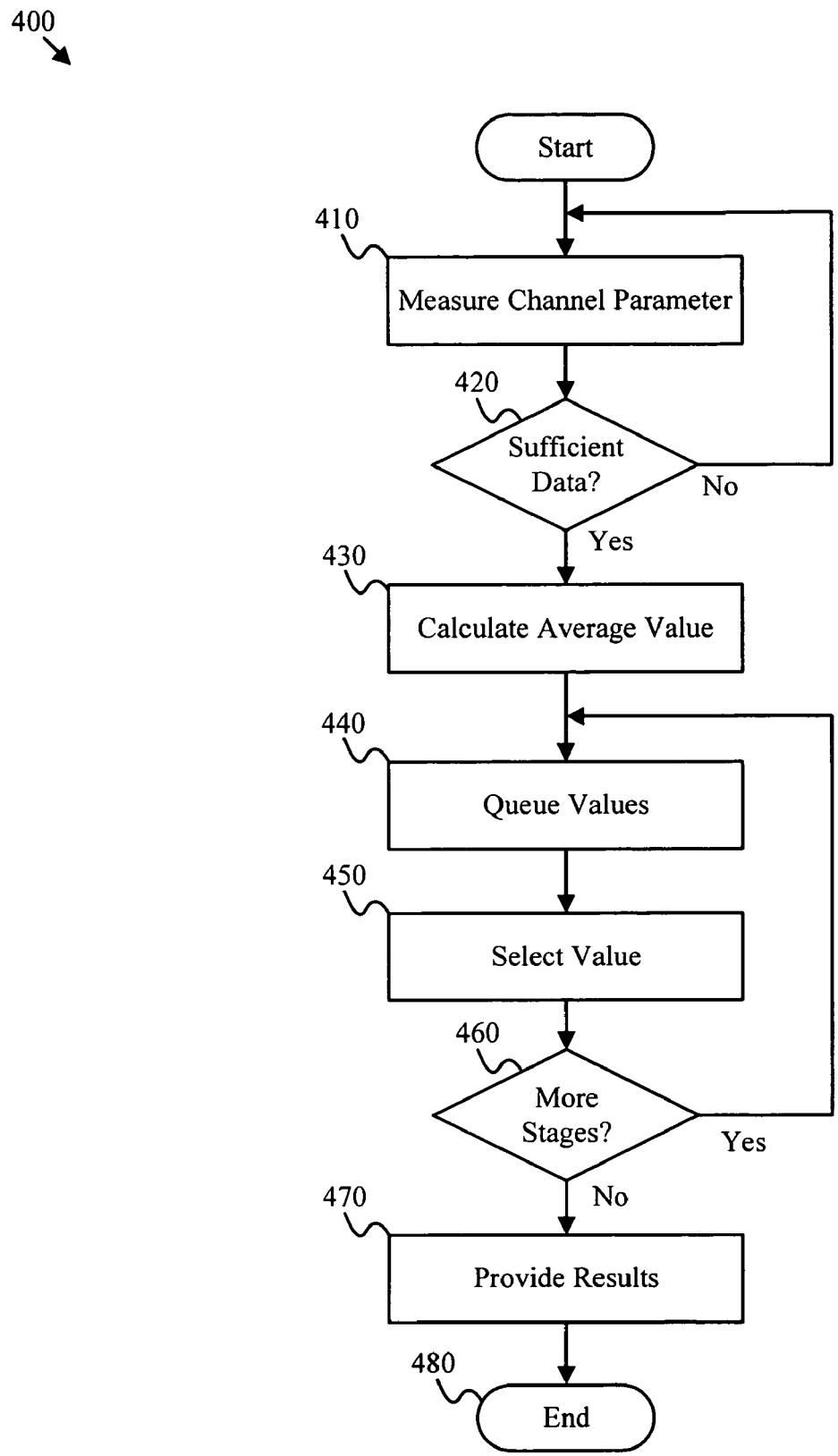
FIG. 4 is a flow chart diagram depicting one embodiment of a channel characterization method of the present invention.

FIG. 4 is a flow chart diagram depicting one embodiment of a channel characterization method 400 of the present invention. As depicted, the channel characterization method 400 includes a measure parameter step 410, a sufficient data test 420, an optional calculate average step 430, a queue values step 440, a select value step 450, and a more stages test 460, and a provide results step 470. The characterization method 400 may be conducted in conjunction with or independent of the channel characterization module 200 depicted in FIG. 2 and the value selection module 300 depicted in FIG. 3.

The measure parameter step 410 measures and/or derives a parameter associated with a communications channel such as a signal-to-noise ratio. The sufficient data test 420 ascertains whether a sufficient number of measurements have been accumulated to calculate an average value. If not, step 410 is repeated. Otherwise, the method proceeds to the calculate average step 430.

The optional calculate average step 430 calculates an average value for the measured data. With certain parameters such as those related to sinusoidal signals, the calculated average may be an rms value. In certain embodiments, the calculate average step 430 may not be necessary and may be skipped.

The queue value step 440 inserts a parameter value such as the average value into a queue. The select value step 450 selects a particular value from the queue such as the minimum, maximum, or median value for presentation to a subsequent stage. The more stages test 460 ascertains whether more (cascaded) queuing stages need to be serviced.

If test 460 is affirmative, the method loops to the queue value step 440 and continues processing on a subsequent stage. Steps 440 and 450 and test 460 are repeated until all the queuing stages are serviced and test 460 is no longer affirmative. Subsequently, the method proceeds to the provide results step 470. The provide results step 470 provides the selected value from the last queuing stage as the computed result and the method ends 480.

Figure 5:
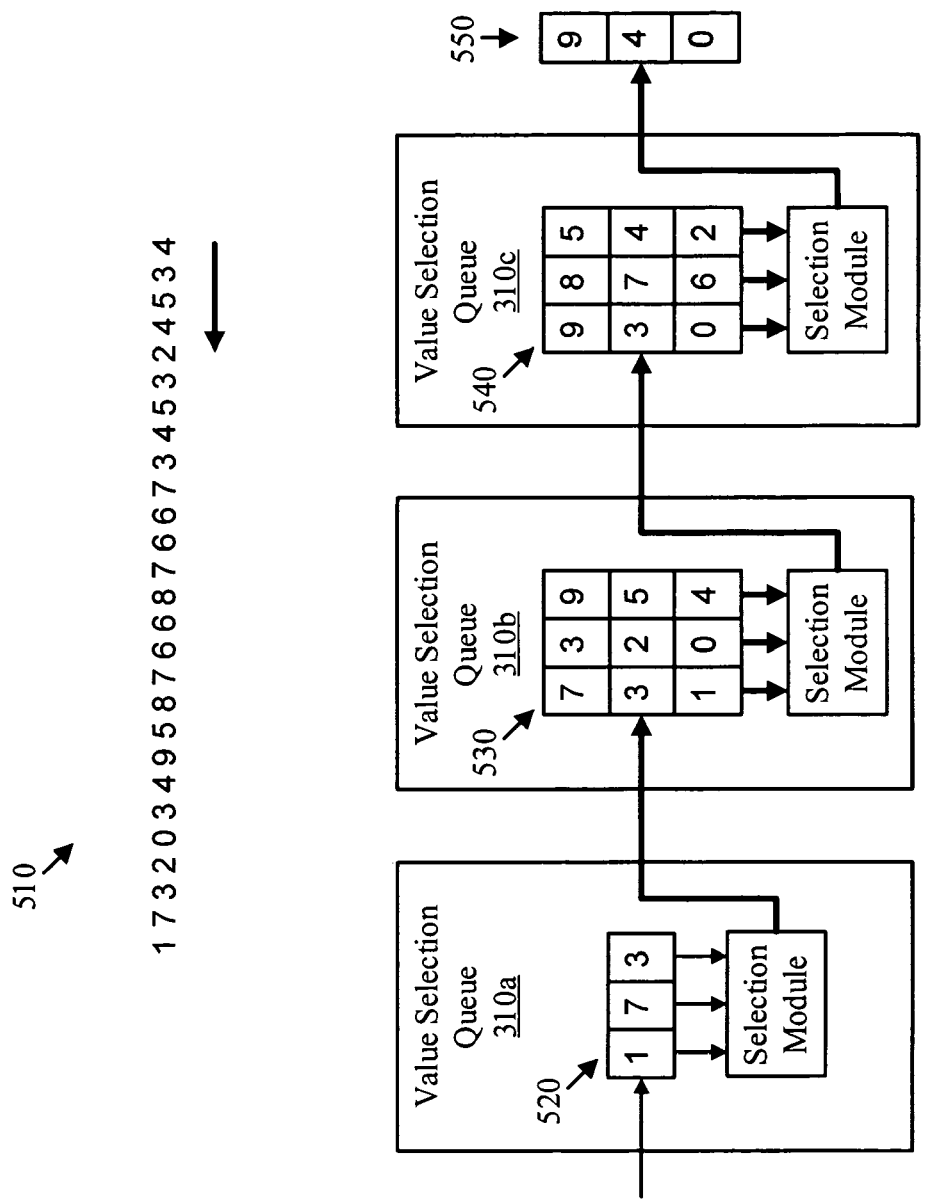
FIG. 5 is a block diagram depicting operational results for a particular embodiment of the value selection module of the present invention.

FIG. 5 is a block diagram depicting operational results for a particular embodiment of the value selection module 300. As depicted, the operational results include an input data stream 510, a set of first stage values 520, a set of second stage values 530, a set of third stage values 540, and a set of results values 550. In the depicted example, the length of each queue within the value selection module is three samples, and a minimum, median, and maximum value are computed for the input data stream 510.

As depicted, the first stage value selection queue 310a has received numeric values 3, 7, and 1 (the tail of the input data stream 510) and selected the numeric value 1 as the minimum, numeric value 3 as the median, and numeric value 7 as the maximum. The selected values are received by the second stage value selection queue 310b and compare to other queued values to select a minimum, median, and maximum value. In the depicted example, numeric value 0 is selected as the minimum from the group of 1, 0, and 4, numeric value 3 is selected as the median from the group of 3, 2, and 5, and numeric value 9 is selected as the maximum from the group of 7, 3, and 9.

The final result of the cascaded queuing and selection process is that numeric value 0 is selected as the minimum value, numeric value 4 is selected as the median value, and numeric value 9 is selected as the maximum value. While numeric values 0 and 9 are the true minimum and maximum values, the true median in the example is actually the numeric value 5—an artifact of processing with multiple stages having short queue lengths. However, under many conditions the selected median approaches the true median and may be computed with far fewer numeric operations.

The present invention facilitates conducting processing operations useful for characterizing a communications channel and improving throughput using fewer computing resources. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for improving communications throughput, the apparatus comprising:
a measurement module configured to measure a plurality of signal-to-noise values for a communications channel; and
a value selection module comprising a plurality of value selection queues in a cascaded arrangement, each value selection queue configured to queue a plurality of values and provide a selected value from the plurality of values, the value selection module configured to receive the plurality of signal-to-noise values and select a particular value to provide an estimated signal-to-noise value for the communications channel.

2. The apparatus of claim 1, further comprising a channel encoder configured to adjust channel encoding in response to a change in the estimated signal-to-noise value.

3. The apparatus of claim 1, wherein the particular value is a minimum value.

4. The apparatus of claim 1, wherein the particular value is a maximum value.

5. The apparatus of claim 1, wherein the measurement module comprises a noise estimator configured to estimate a noise level.

6. The apparatus of claim 1, wherein the measurement module comprises a signal estimator configured to estimate a signal level.

7. The apparatus of claim 1, wherein the measurement module comprises a signal sampler configured to sample a channel signal.

8. The apparatus of claim 1, wherein the measurement module comprises an averaging module configured to average a plurality of values.

9. The apparatus of claim 8, wherein the averaging module is configured to calculate an rms value.

10. A method for improving communications throughput, the method comprising:
    measuring a plurality of signal-to-noise values for a communications channel;
    selecting a particular value of the plurality of signal-to-noise values to provide an estimated signal-to-noise value for the communications channel;
    wherein selecting the particular value comprises queuing a plurality of values, providing a first selected value from the plurality of values, queuing a plurality of first selected values, and providing a second selected value from the plurality of first selected values; and
    adjusting a channel encoding in response to a change in the selected signal-to-noise value.

11. The method of claim 10, wherein the particular value is a minimum value.

12. The method of claim 10, wherein the particular value is a maximum value.

13. The method of claim 10, further comprising estimating a noise level.

14. The method of claim 10, further comprising estimating a signal level.

15. The method of claim 10, further comprising averaging a plurality of channel metrics.

16. The method of claim 10, wherein the averaging comprises calculating an rms value.

17. The method of claim 10, wherein measuring comprises sampling a signal.

18. The method of claim 10, wherein measuring comprises computing an error signal.

19. An apparatus for characterizing a communications channel, the apparatus comprising:
    means for measuring a plurality of signal-to-noise values for a communications channel;
    means for selecting a particular value of the plurality of signal-to-noise values to provide an estimated signal-to-noise value for the communications channel;
    wherein the means for selecting a particular value comprises a plurality of value selection queues in a cascaded arrangement, each value selection queue comprising means for queuing a plurality of values and means for providing a selected value from the plurality of values; and
    means for adjusting a channel encoding in response to a change in the estimated signal-to- noise value.

20. A system for characterizing a communications channel, the system comprising:
    a communications channel configured to bear information;
    a measurement module configured to measure a plurality of signal-to-noise values for the communications channel;
    a value selection module comprising a plurality of value selection queues in a cascaded arrangement, each value selection queue configured to queue a plurality of values and provide a selected value from the plurality of values, the value selection module configured to receive the plurality of signal-to-noise values and select a particular value to provide an estimated signal-to-noise value for the communications channel; and
    a channel encoder configured to adjust a channel encoding process in response to a change in the estimated signal-to-noise value.

21. A computer readable storage medium comprising computer readable program code configured to carry out a method for characterizing a communications channel, the method comprising:
    measuring a plurality of signal-to-noise values for a communications channel;
    selecting a particular value of the plurality of signal-to-noise values to provide an estimated signal-to-noise value for the communications channel;
    wherein selecting the particular value comprises queuing a plurality of values, providing a first selected value from the plurality of values, queuing a plurality of first selected values, and providing a second selected value from the plurality of first selected values; and
    adjusting a channel encoding in response to a change in the estimated signal-to-noise value.

* * * * *